(12) United States Patent  
Carter

(10) Patent No.: US 6,590,794 B1
(45) Date of Patent: Jul. 8, 2003

(54) APPARATUS AND METHOD FOR MEASURING CURRENT

(75) Inventor: Robert Carter, Knutsford (GB)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/684,957

(22) Filed: Oct. 5, 2000

(30) Foreign Application Priority Data

Oct. 15, 1999 (GB) .............................. 9924299

(51) Int. Cl.[7] ..................... H02M 5/42; H02M 7/5387
(52) U.S. Cl. ........................... 363/98; 363/132
(58) Field of Search ..................... 363/98, 132, 56, 363/59, 135, 136, 37, 81, 87

(56) References Cited

U.S. PATENT DOCUMENTS

| 4,099,225 A | * | 7/1978 | Nygaard ................. 363/56 |
| 4,291,265 A | * | 9/1981 | Kawada et al. ........... 318/782 |
| 4,788,485 A | * | 11/1988 | Kawagishi et al. ........ 318/811 |
| 4,816,985 A | * | 3/1989 | Tanahashi ................ 363/81 |
| 4,896,242 A | * | 1/1990 | Neft ..................... 361/87 |
| 5,177,677 A | * | 1/1993 | Nakata et al. ............ 363/89 |
| 5,615,102 A | * | 3/1997 | Daijo .................... 363/132 |
| 5,877,950 A | | 3/1999 | Bonsignour et al. ........ 363/98 |
| 6,111,767 A | * | 8/2000 | Handleman ............... 363/95 |

FOREIGN PATENT DOCUMENTS

| EP | 0 075 357 | 3/1983 |
| EP | 2 654 877 | 5/1991 |
| GB | 2 190 754 | 11/1987 |
| GB | 2 313 202 | 11/1997 |

* cited by examiner

Primary Examiner—Rajnikant B. Patel
(74) Attorney, Agent, or Firm—Crowell & Moring LLP

(57) ABSTRACT

The present invention discloses apparatus and a method for measuring the motor current in an AC drive system in which the DC link current in a voltage source inverter (20) is separated into a transistor current, and a diode current, and then measured separately with shunts (22, 24). This results in two independent non-isolated current measurements and allows for a more accurate calculation of the magnitude of the motor current. (FIG. 2)

27 Claims, 5 Drawing Sheets

APPARATUS AND METHOD FOR MEASURING CURRENT

BACKGROUND OF THE INVENTION

The present invention relates to the field of current measurement. More specifically, the present invention relates to apparatus and a method for measuring load current in an alternating current (AC) inverter drive system.

It is well known in the art that a measurement of the load current can provide means for protecting the drive system during an overload situation. It is also known that knowledge of the load current can be used as a means of measuring the output of the drive system.

In one technique, load currents in an AC drive system are measured by fitting isolating current transducers to a motor output. However, drive systems incorporating such devices are expensive.

It is also know to measure load currents by sampling the motor currents in the direct current (DC) link of the inverter. However, drive systems employing this sampling technique are sensitive to noise and measurement black spots during the pulse-width modulation (PWM) cycle when data is not available or unreliable. This problem is particularly severe at high switching frequencies.

Furthermore, the mean DC link current in the open loop AC inverter drive system can be measured by integrating over an integral number of PWM cycles. This method reduces the effects of noise on the measurement reliability. However, while this method can be used to measure the real component of the load current, the imaginary component of the current is still unknown and must be estimated. Thus any subsequent calculation of the total load current is only as accurate as the estimation of the imaginary component.

FIG. 1 is a circuit diagram of a known voltage source DC link inverter 100 which measures the load current by sampling the current flowing through the DC link 2. This type of inverter is often used in open loop AC drive systems. The DC link comprises a positive DC input 3 and a negative DC input 4, which are both in electrical connection with capacitor 6. The current is measured through the negative DC input 4 with current measurement means 12. In this example the current measurement means is a shunt. The use and operation of shunts is well known in the art of electronics. The inverter 10 is a three phase inverter comprising a first switch 14, a second switch 16, and a third switch 18. Each of the first, second, and third switches includes a respective pair of transistors, or other suitable electronic switching element: 14a and 14b, 16a and 16b, 18a and 18b; a respective pair of diodes: 14c and 14d, 16c and 16d, 18c and 18d. Each of the first, second, and third switches also comprises a respective output: 7, 8, and 9. The outputs are electrically connected to a motor (not shown).

The shunt 12 functions to measure the DC link current ($I_{DC}$) into inverter 10 via the negative DC input 4. The instantaneous value of $I_{DC}$ can be used to provide protection to the device in situations such as drive system output short circuit. The real component of the current ($I_{real}$) may be calculated from the mean value of $I_{DC}$ and used to facilitate control of the motor. However, to calculate the actual magnitude of the load current the imaginary component of the current must be estimated.

SUMMARY OF THE INVENTION

Estimation of the imaginary component of the load current can lead to errors in the calculation of the load current magnitude. These errors are worse at certain frequencies and drive system loads. Furthermore, the calculation of the real component of the current involves a division by the modulation depth of the PWM. This quantity is unacceptably inaccurate at low modulation depths and high switching frequencies.

It is an object of the present invention to provide apparatus and a method for measuring the load current in which an accurate calculation of the load current is obtained without the need for estimating the imaginary component.

According to the present invention there is provided apparatus for measuring current flowing from an inverter to a load, comprising a first current measuring means and a second current measuring means, said first current measuring means and said second current measuring means being arranged such that said first current measuring means measures a first current flowing through an inverter and said second current measuring means measures a second current flowing through said inverter.

According to an aspect of the present invention, said first current measuring means is coupled to a plurality of electronic switches forming part of said inverter, and said second current measuring means is coupled to a plurality of diodes forming part of said inverter, said first current measuring means and said second current measuring means being arranged such that said first current measuring means measures a first current flowing through said plurality of electronic switches and said second current measuring means measures a second current flowing through said plurality of diodes.

According to an alternative aspect of the present invention, said first current measuring means is coupled to a negative DC input forming part of a DC link to said inverter, and said second current measuring means is coupled to plurality of electronic switches forming part of said inverter, said first current measuring means and said second current measuring means being arranged such that said first current measuring means measures a first current flowing through said negative DC input and said second current measuring means measures a second current flowing through said plurality of electronic switches.

According to yet another alternative aspect of the present invention, said first current measuring means is coupled to a negative DC input forming part of a DC link to said inverter, and said second current measuring means is coupled to plurality of diodes forming part of said inverter, said first current measuring means and said second current measuring means being arranged such that said first current measuring means measures a first current flowing through said negative DC input and said second current measuring means measures a second current flowing through said plurality of diodes.

According to a further aspect of the present invention, said apparatus further comprises processing means coupled to said first and said second current measuring means, said processing means being arranged to calculate said load current based upon said first and second currents.

Said processing means may be further arranged to calculate the real component of the said load current based upon said first and second currents.

The current measuring means may be shunts. The electronic switches may be transistors.

Said apparatus may be included in an AC drive system. The drive system may be an open loop system. The drive system may use pulse width modulation. The pulse width modulation may be space vector modulation.

According to the present invention there is provided a method of measuring current flowing from an inverter to a load, said method comprising the steps of: measuring a first current flowing through said inverter, measuring a second current flowing through said inverter, and calculating said load current based upon said first and second currents.

According to a method aspect of the present invention, said inverter comprises a plurality of electronic switches and a plurality of diodes, said step of measuring a first current is a measurement of a current flowing through said plurality of electronic switches, and said step of measuring a second current is a measurement of a current flowing through said plurality of diodes.

According to an alternative method aspect of the present invention, said inverter comprises a plurality of diodes and is coupled to a negative DC input of a DC link, and said step of measuring a first current is a measurement a current flowing through said negative DC input, and said step of measuring a second current is a measurement of a current flowing through said plurality of diodes.

According to yet a further alternative method aspect of the present invention said inverter comprises a plurality of electronic switches and is coupled to a negative DC input of a DC link, and said step of measuring a first current is a measurement a current flowing through said negative DC input, and said step of measuring a second current is a measurement of a current flowing through said plurality of electronic switches.

Said method may include a further step of calculating a real component of said load current based upon said first and second currents.

Said method may include yet a further step of calculating an imaginary component of said load current based upon said load current and said real component of said load current.

Advantageously, the present invention provides for all measurements to be DC quantities which are integrated over an integral number of PWM cycles to cancel any adverse effects due to switching frequency harmonic noise.

Advantageously, the circulating currents are measured directly thus eliminating inaccuracies in the load current measurement due to divisions by small numbers when operating at low modulations depths.

Furthermore, the transistor current measurement may also be used for drive system protection.

While the principle advantages and features of the invention have been described above, a greater understanding and appreciation of the invention may be obtained by referring to the drawings and detailed description of the preferred embodiments, presented by way of example only, in which;

DETAILED DESCRIPTION OF THE DRAWING

Figure 1:
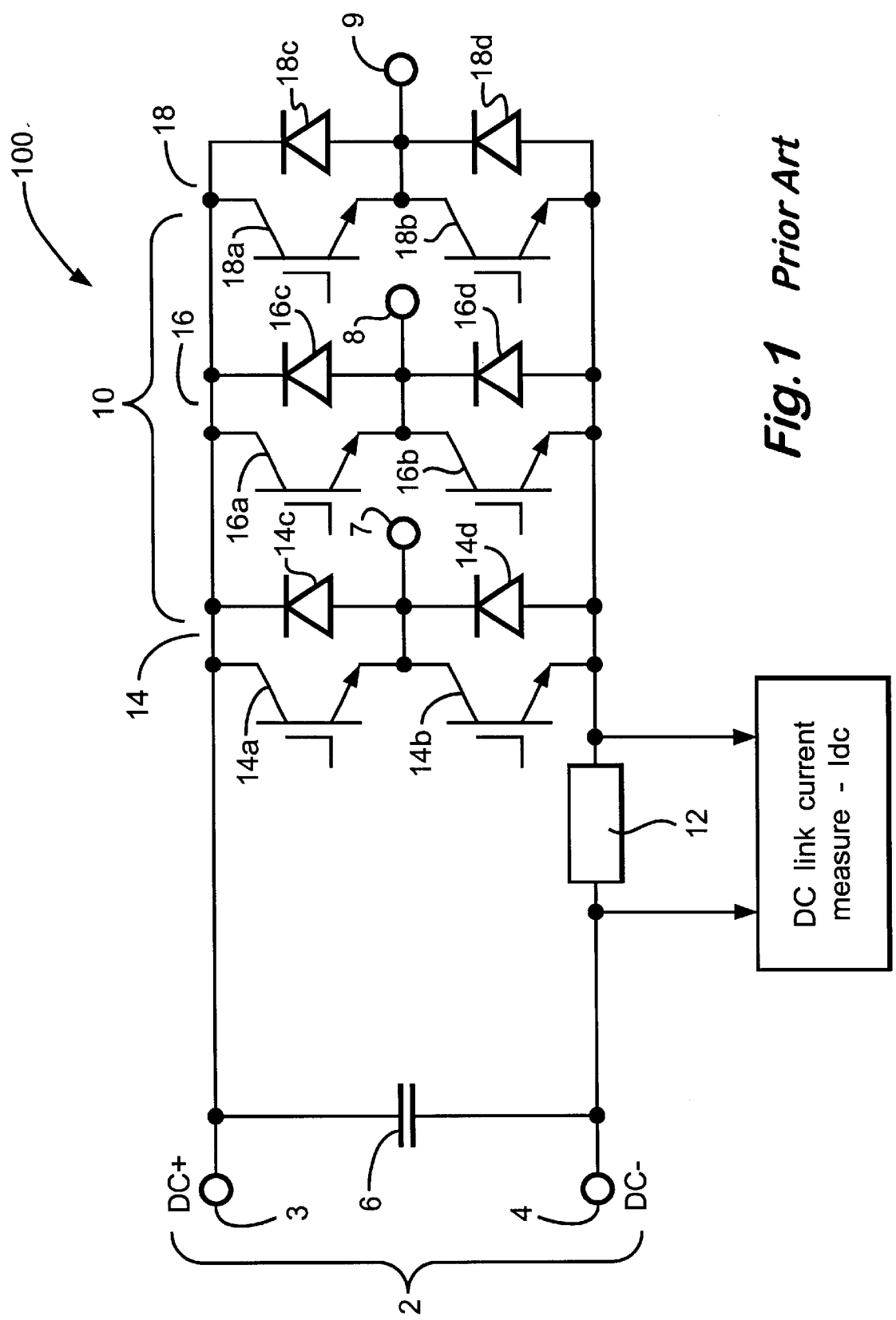
FIG. 1 is a circuit diagram of a known voltage source DC link inverter which measures load current by sampling current flowing through the DC link.

Throughout the description, like parts shall bear identical reference numerals.

Figure 2:
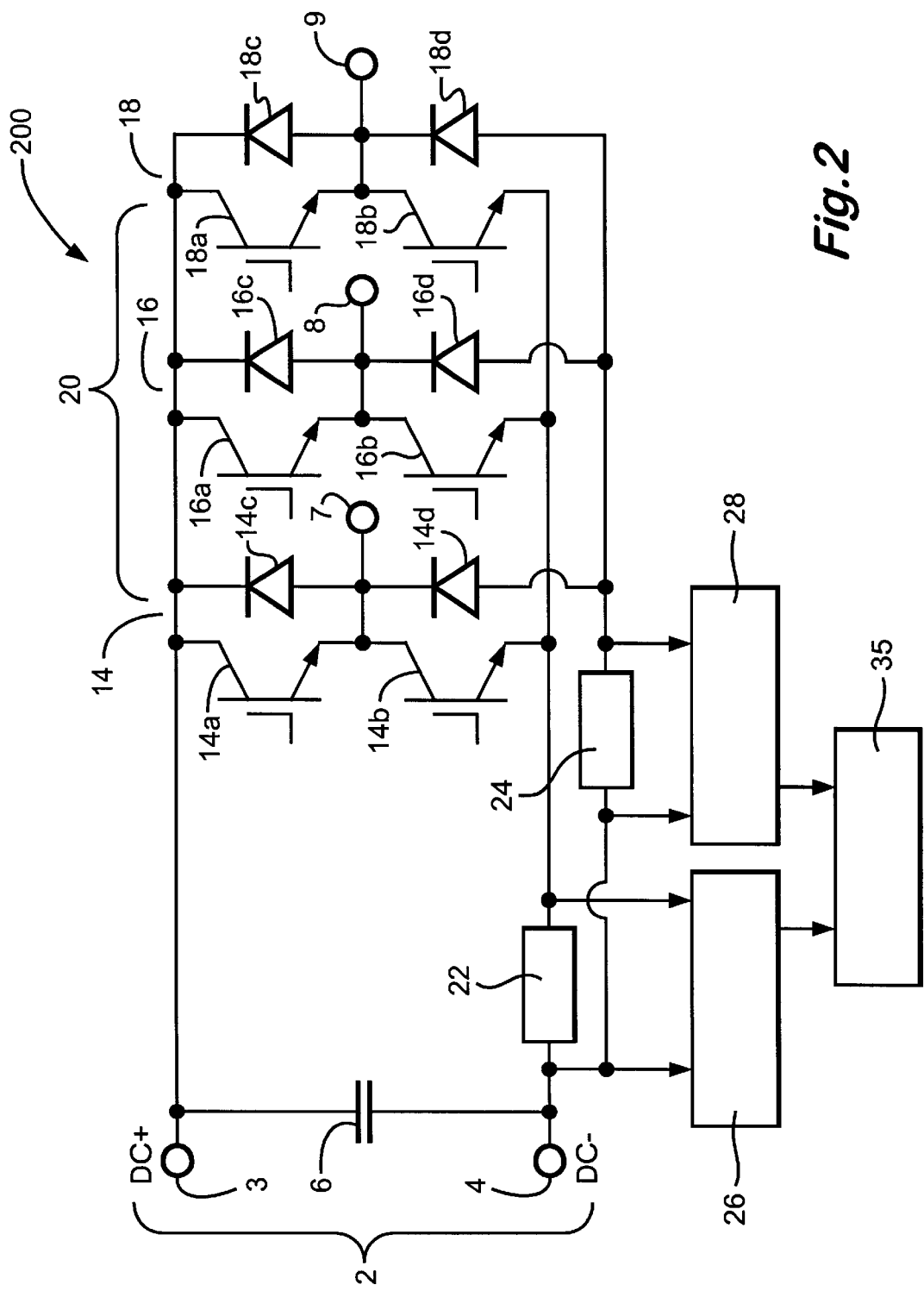
FIG. 2 is a circuit diagram of a current measurement arrangement according to an embodiment of the present invention.

Referring to FIG. 2, a three phase voltage source DC link inverter 200 is shown comprising DC link 2 and inverter 20. The DC link 2 comprises a positive DC input 3 and a negative DC input 4, which are both in electrical connection with capacitor 6. The inverter 20 comprises a first switch 14, a second switch 16, and a third switch 18. Each of the first, second, and third switch includes a respective pair of electronic switches: 14a and 14b, 16a and 16b, 18a and 18b; a respective pair of diodes: 14c and 14d, 16c and 16d, 18c and 18d. The electronic switches 14a, 14b, 16a, 16b, 18a, 18b are preferably transistors. Each of the first, second, and third switches also comprises a respective output: 7, 8, and 9. The outputs are electrically connected to a motor (not shown).

Two current measuring means 22, 24 are disposed in the DC link inverter 200. Each current measuring means 22, 24 is coupled to processing means 26, 28 respectively. Processing means 26, 28 are coupled to further processing means 35. The current measurement means 22, 24 are shunts. Shunt 22 is electrically coupled to transistors 14a, 14b, 16a, 16b, 18a and 18b such that shunt 22 can measure the current $I_{transistor}$, through the transistors. Shunt 24 is electrically coupled to diodes 14c, 14d, 16c, 16d, 18c and 18d such that shunt 24 can measure the current, $I_{diode}$, through the diodes. By arranging the shunts in such a manner, the current flowing through DC link inverter 200 can always be measured. For example, when the current in inverter 20 is "freewheeling" or circulating, the current must pass through shunt 24 and thus be measured.

Currents $I_{transistor}$ and $I_{diode}$ are converted from analogue to digital signals by processing means 26 and 28 respectively. Each processing means includes an analogue-to-digital converter for this purpose. The values of $I_{transistor}$ and $I_{diode}$ are communicated to further processing means 35. Further processing means 35 is arranged to calculate the values of $I_{DC}$, $I_{real}$, and $I_{load}$ based on the measured values of $I_{transistor}$ and $I_{diode}$. Both the real component of the load current ($I_{real}$) and the load current ($I_{load}$) are dependent on $I_{transistor}$, $I_{diode}$, and on the depth of modulation. The embodiment shown in FIG. 2 uses a space vector modulation. The variable X equals the percentage of modulation, with 100% modulation being the maximum modulation possible with a sine wave output. However, slightly higher fundamental output voltages are possible by over modulating. Over modulation results in unwanted voltages at harmonic frequencies. Space vector modulation is a pulse width modulation technique well known in the art of AC drive systems.

The DC link current ($I_{DC}$) is given by:

$$I_{DC} = I_{trans} - I_{diode}$$

The real component of the load current ($I_{real}$) is given by:

$$I_{real} = (I_{DC} \times 82)/X$$

The load current ($I_{load}$) is then given by:

$$I_{load} = (A \times I_{trans} + B \times I_{diode}) \left( \frac{C - X}{D} \right),$$

where A, B, C, and D are coefficients which dependent on the type of modulation being used. For normal symmetrical space vector modulation A=0.55, B=0.45, C=1000, and D=612.

For asymmetrical space vector modulation, where at all times one phase or another is locked to the DC negative potential, A=0.45, B=0.55, C=−80 and D=−141.

When over modulation is used the modulation coefficients must be altered accordingly. For symmetric over modulation A=0.46, B=0.54, C=1000, and D=574. For asymmetric over modulation A=0.49, B=0.51, C=80, and D=131.

As will be appreciated by the skilled man, all of the above modulation coefficients may be modified slightly to account for component tolerances or other factors. The modulation coefficients may need to be modified by up to 10 percent of the above values.

These coefficients give $I_{real}$ and $I_{load}$ as root mean squared (rms) values.

As will be appreciated, other types of modulation schemes could be used and which would require modifications to the values of the modulation dependent coefficients A, B, C, and D given above, although all symmetrical waveforms generally require very similar coefficients.

Figure 3:
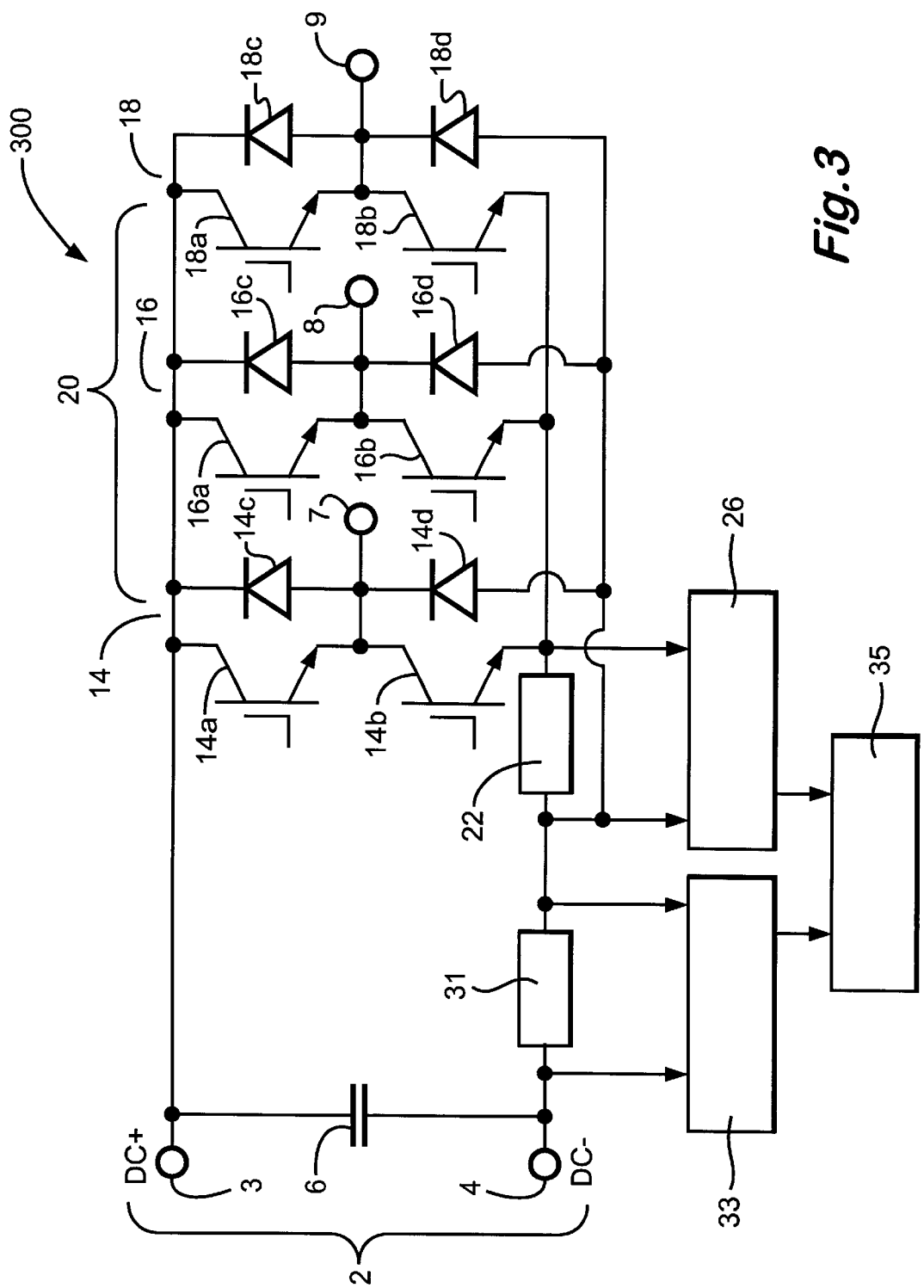
FIG. 3 is a circuit diagram of a current measurement arrangement according to a further embodiment of the present invention.

In a further embodiment of the present invention, FIG. 3 shows a three phase voltage source DC link inverter 300 comprising DC link 2 and inverter 20. Two current measuring means 22, 31 are disposed in the DC link inverter 300. Each current measuring means 22, 31 is coupled to processing means 26, 33 respectively. Processing means 26, 33 are coupled to further processing means 35. The current measurement means 22, 31 are shunts.

Shunt 22 is electrically coupled to transistors 14a, 14b, 16a, 16b, 18a and 18b such that shunt 22 can measure the current, $I_{transistor}$, through the transistors. Shunt 31 is electrically coupled to negative DC input 4 such that shunt 31 can measure the DC link current) $I_{DC}$, directly.

The diode current ($I_{diode}$) is given by:

$$I_{diode} = I_{transistor} - I_{DC}$$

The real component of the load current and the load current are calculated in the same manner and with the same equations as detailed above for the embodiment shown in FIG. 2.

Figure 4:
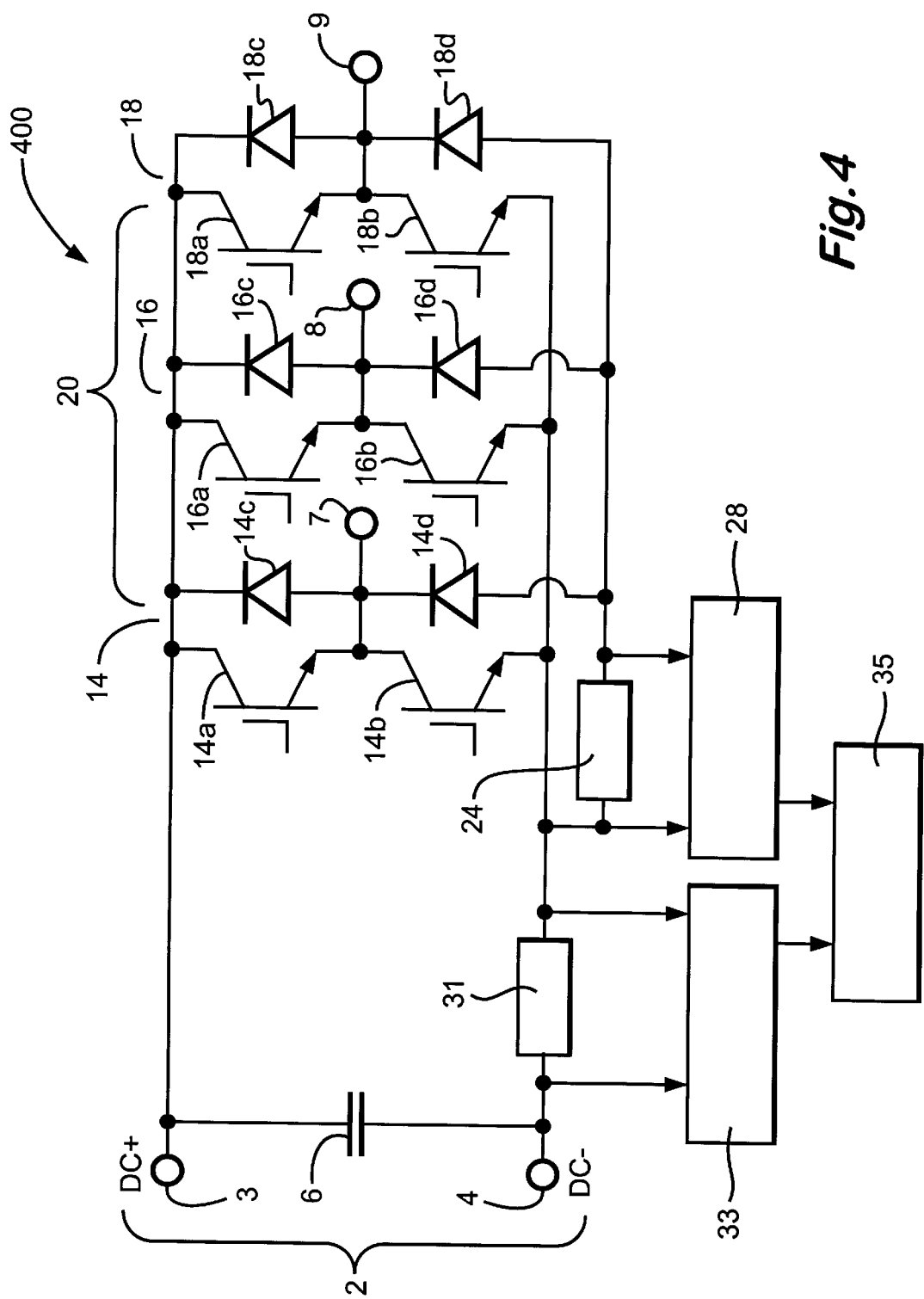
FIG. 4 is a circuit diagram of a current measurement arrangement according to yet a further embodiment of the present invention.

In yet a further embodiment of the present invention, FIG. 4 shows a three phase voltage source DC link inverter 400 comprising DC link 2 and inverter 20. Two current measuring means 24, 31 are disposed in the DC link inverter 300. Each current measuring means 24, 31 is coupled to processing means 28, 33 respectively. Processing means 28, 33 are coupled to further processing means 35. The current measurement means 24, 31 are shunts.

Shunt 24 is electrically coupled to diodes 14c, 14d, 16c, 16d, 18c and 18d such that shunt 24 can measure the current, $I_{diode}$, through the diodes. Shunt 31 is electrically coupled to negative DC input 4 such that shunt 31 can measure the DC link current, $I_{DC}$, directly.

The transistor current ($I_{transistor}$) is given by:

$$I_{transistor} = I_{diode} + I_{DC}$$

The real component of the load current and the load current are calculated in the same manner and with the same equations as detailed above for the embodiment shown in FIG. 2.

Figure 5:
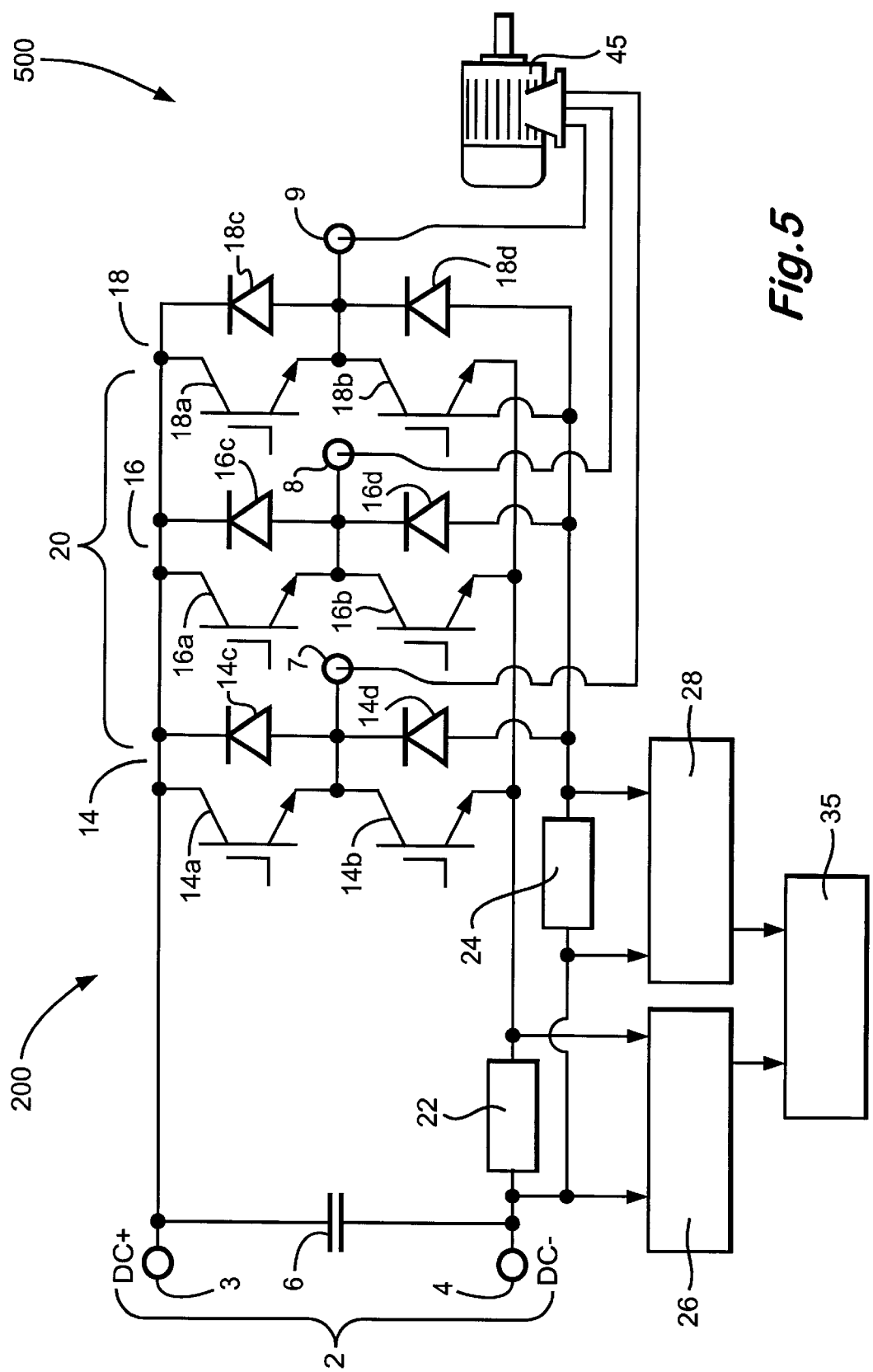
FIG. 5 is a diagram of a drive system comprising the current measurement arrangement shown in FIG. 2.

Referring to FIG. 5, AC drive system 500 comprises the current measurement arrangement 200 shown in FIG. 2 and a motor 45. Outputs 7, 8, and 9 from inverter 20 are electrically connected to motor 45. The motor is connected to a drive mechanism (not shown). Calculation of the load current provides protection for the motor during an overload situation in the drive mechanism. Calculation of the real component of the load current provides for control of the motor output.

While FIG. 5 includes the current measuring arrangement 200 shown in FIG. 2, the further embodiments 300, 400 of current measuring arrangements shown in FIGS. 3, 4 may also be used in the drive system, without departing from the scope of the present invention.

As will be appreciated, the drive system shown in FIG. 5 may be an open loop system. Alternatively, the drive system may be a closed loop system.

The processing means 26, 28, 33, and 35 may be microprocessors.

As will be appreciated, the imaginary component of the motor current may also be easily calculated from the values of $I_{load}$ and $I_{real}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for determining current flowing between an inverter and a load, said apparatus comprising:

a first current measuring device;

a second current measuring device, said first and second current measuring devices being arranged on a DC input side of the inverter, such that said first current measuring device measures a first current flowing at said input side of said inverter and said second current measuring device measures a second current flowing at said input side of said inverter; and a processor which calculates a magnitude of load current which flows between the inverter and the load, based on said first and second currents measured by said first and second current measuring devices.

2. An apparatus as claimed in claim 1, wherein:

said first current measuring device is coupled to a plurality of electronic switches forming part of said inverter;

said second current measuring device is coupled to a plurality of diodes forming part of said inverter; and said first and second current measuring devices are arranged such that said first current measuring device measures a first current, which flows through said plurality of electronic switches, and said second current measuring device measures a second current, which flows through said plurality of diodes.

3. An apparatus as claimed in claim 1, wherein:

said first current measuring device is coupled to a negative DC input forming part of a DC link to said inverter;

said second current measuring device is coupled to a plurality of electronic switches forming part of said inverter; and said first and second current measuring devices are arranged such that said first current measuring device measures a first current, which flows through said negative DC input, and said second current measuring device measures a second current, which flows through said plurality of electronic switches.

4. An apparatus as claimed in claim 1, wherein:

said first current measuring device is coupled to a negative DC input forming part of a DC link to said inverter;

said second current measuring device is coupled to plurality of diodes forming part of said inverter; and said first and second current measuring devices are arranged such that said first current measuring means measures a first current which flows through said negative DC input and said second current measuring means measures a second current which flows through said plurality of diodes.

5. An apparatus as claimed in claim 1, wherein said processor calculates a real component of said load current based upon said first and second currents.

6. An apparatus as claimed in claim 5, wherein said processor calculates an imaginary component of said load current based upon said load current and said real component of said load current.

7. An apparatus as claimed in claim 1, wherein said first and second current measurement means are shunts.

8. An apparatus as claimed in claim 1, wherein said electronics switches are transistors.

9. A power module comprising said apparatus as claimed in claim 1.

10. An AC drive system comprising a motor and said apparatus as claimed in claim 1.

11. An AC drive system as claimed in claim 10, wherein said system is an open loop system.

12. An AC drive system as claimed in claim 10, wherein said drive system uses pulse width modulation.

13. An AC drive system as claimed in claim 12, wherein said processing means is arranged to calculate said load current, $I_{load}$, using the following equation:

$$I_{load} = (A \times I_{transistor} + B \times I_{diode})\left(\frac{C-X}{D}\right)$$

where: $I_{transistor}$ is said first current flowing through said plurality of electronic switches, $I_{diode}$ is said second current flowing through said plurality of diodes, X is a percentage of modulation, and A, B, C, and D are modulation dependent coefficients.

14. An AC drive system as claimed in claim 12, wherein said pulse width modulation is symmetrical space vector modulation.

15. An AC drive system as claimed in claim 14, wherein said modulation dependent coefficients are as follows: A=0.55, B=0.45, C=1000, and D=612.

16. An AC drive system as claimed in claim 12, wherein said pulse width modulation is asymmetrical space vector modulation.

17. An AC drive system as claimed in claim 16, wherein said modulation dependent coefficients are as follows: A=0.45, B=0.55, C=−80, and D=−141.

18. An AC drive system as claimed in claim 12, wherein said pulse width is over modulated symmetrical space vector modulation.

19. An AC drive system as claimed in claim 18, wherein said modulation dependent coefficients are as follows: A=0.46, B=0.54, C=1000, and D=574.

20. An AC drive system as claimed in claim 12, wherein said pulse width is over modulated asymmetrical space vector modulation.

21. An AC drive system as claimed in claim 20, wherein said modulation dependent coefficients are as follows: A=0.49, B=0.51, C=80, and D=131.

22. A method of determining load current flowing between an inverter and a load, said method comprising:

measuring a first current flowing at a DC input side of said inverter;

measuring a second current flowing at said DC input side of said inverter; and calculating load current flowing between an output side of said inverter and said load, based upon said first and second currents.

23. A method of determining load current as claimed in claim 22, wherein:

said inverter comprises a plurality of electronic switches and a plurality of diodes;

said measuring a first current comprises measurement of a current flowing through said plurality of electronic switches; and said measuring a second current comprises measurement of a current flowing through said plurality of diodes.

24. A method of determining load current as claimed in claim 22, wherein:

said inverter comprises a plurality of diodes and is coupled to a negative DC input of a DC link;

said measuring of a first current comprises measurement of a current flowing through said negative DC input; and said measuring of a second current comprises measurement of a current flowing through said plurality of diodes.

25. A method of determining load current as claimed in claim 22, wherein:

said inverter comprises a plurality of electronic switches and is coupled to a negative DC input of a DC link;

said measuring of a first current comprises measurement of a current flowing through said negative DC input; and said measuring of a second current comprises measurement of a current flowing through said plurality of electronic switches.

26. A method as claimed in claim 22, further comprising:

calculating a real component of said load current based upon said first and second currents.

27. A method as claimed in claim 26, further comprising:

calculating an imaginary component of said load current based upon said load current and said real component of said load current.

* * * * *